(12) United States Patent
Takagi et al.

(10) Patent No.: US 6,536,680 B2
(45) Date of Patent: Mar. 25, 2003

(54) COMBUSTOR WITH NON-COMBUSTION AIR INTRODUCTION

(75) Inventors: Masashi Takagi, Kariya (JP); Masakazu Ozaki, Kariya (JP); Makoto Suzuki, Mishima (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/100,388

(22) Filed: Mar. 18, 2002

(65) Prior Publication Data

US 2002/0130191 A1 Sep. 19, 2002

(30) Foreign Application Priority Data

Mar. 19, 2001 (JP) .......................... 2001-078866

(51) Int. Cl.[7] .................................. B60H 1/02
(52) U.S. Cl. ..................... 237/12.3 C; 165/41
(58) Field of Search ................... 237/12.3 C, 12.3 A, 237/12.3 R; 165/41, 42, 66, 164

(56) References Cited

U.S. PATENT DOCUMENTS

| | | | | |
|---|---|---|---|---|
| 3,954,423 A | * | 5/1976 | Hamper et al. | 48/107 |
| 4,099,495 A | * | 7/1978 | Kiencke et al. | 123/406.65 |
| 5,398,747 A | * | 3/1995 | Miaoulis | 165/41 |

* cited by examiner

Primary Examiner—Derek Boles
(74) Attorney, Agent, or Firm—Harness, Dickey & Pierce, PLC

(57) ABSTRACT

In a combustor for supplying combustion heat to a heater core and an intake side of an engine, when the engine is started, combustion gas is supplied to an intake side of the engine while non-combustion air is introduced into a combustion gas passage partitioned from a water passage of the heater core by a heat-conduction partition member. In this case, non-combustion air is used as an air curtain for interrupting a heat transmission from the combustion gas of the combustion gas passage to water of the water passage.

16 Claims, 5 Drawing Sheets

COMBUSTOR WITH NON-COMBUSTION AIR INTRODUCTION

CROSS-REFERENCE TO RELATED APPLICATION

This application is related to and claims priority from Japanese Patent Application No. 2001-78866 filed on Mar. 19, 2001, the content of which are hereby incorporated by reference.

BACKGROUND OF THE INVENTION

1. Field of the Invention

The present invention relates to a combustor for supplying a combustion heat to a heating heat exchanger (heater core) for heating air blown into a passenger compartment, and other vehicle equipment such as an engine (internal combustion engine) and a catalytic converter.

2. Description of Related Art

In a conventional combustor disclosed in JP-A-2000-234567, when an engine is started in a cool season, combustion gas is supplied from the combustor to an intake side of the engine, thereby directly heating a combustion chamber of the engine and improving starting performance of the engine in the cool season. After the engine is started, the combustor heats hot water to be supplied to a heater core.

On the other hand, in a conventional heating combustor, as disclosed in JP-A-9-133328, a hot water passage, through which hot water flows, is generally provided to cover a combustion gas passage through which combustion gas flows. However, in the combustor, combustion gas and hot water are always heat-exchanged with each other. Because the heat of the combustion gas is always transmitted into the hot water, it is difficult to always supply a sufficient amount of heat to a vehicle equipment such as the engine and the catalytic converter.

SUMMARY OF THE INVENTION

In view of the foregoing problems, it is an object of the present invention to provide a combustor for supplying a combustion heat to a heating heat exchanger for heating air blown into a passenger compartment, which can supply a sufficient amount of heat to other vehicle equipment such as an engine and a catalytic converter.

It is an another object of the present invention to provide a control method of the combustor, for improving fuel combustibility of the combustor while sufficient amount of heat can be supplied to the other vehicle equipment.

According to the present invention, in a combustor for supplying a combustion heat to a heating heat exchanger and to other vehicle equipment, fuel is burned using air for combustion introduced from an outside to generate combustion gas, and the combustion gas is heat-exchanged with a thermal medium flowing into the heating heat exchanger. A heat-conduction partition member, through which the heat exchange between the combustion gas and the thermal medium is performed, is disposed for partitioning from each other a combustion gas passage through which the combustion gas from the combustion chamber flows and a thermal medium passage through which the thermal medium flows. Further, a first discharge port from which the combustion gas is supplied to the other vehicle equipment is provided in the combustion gas passage, a non-combustion air introduction port from which air for non-combustion is introduced into the combustion gas passage toward the partition member is provided, and an opening/closing device is disposed for opening and closing the non-combustion air introduction port.

Accordingly, when the air for non-combustion is introduced into the combustion gas passage, the temperature of the combustion gas is decreased in the combustion gas passage, and a temperature difference is decreased between the combustion gas and the thermal medium, thereby restricting the heat-exchange therebetween. Thus, heat of the combustion gas can be restricted from being transmitted into the thermal medium, so a large amount of heat can be supplied to the other vehicle equipment. Here, although the temperature of the combustion gas is decreased, a total gas amount is increased, and a total heat amount thereof is not greatly changed.

Preferably, the non-combustion air introduction port is provided at a side of the heat-conduction partition member so that the air for non-combustion flows along a wall surface of the heat-conduction partition member. Therefore, the air for non-combustion readily flows along the wall surface of the heat-conduction partition member, and functions as an air curtain for interrupting a heat transmission from the combustion gas to the thermal medium. Accordingly, heat of the combustion gas can be prevented from being transmitted into the thermal medium, and a large amount of heat can be sufficiently supplied to the other vehicle equipment.

According to a control method of the combustor, when the air for non-combustion is introduced into the combustion gas passage through the non-combustion air introduction port, air-blowing capacity of an air pump for blowing air for combustion and air for non-combustion is increased, as compared with a case where the non-combustion air introduction port is closed and air is blown by the air pump only for combustion in the combustion chamber. Therefore, fuel combustibility of the combustor can be improved while sufficient amount of heat can be supplied to the other vehicle equipment.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to FIGS. 1–2B. In the first embodiment, a combustor of the present invention is typically used for a heating heat exchanger for heating air blown into a passenger compartment, and for an intake-air heating system (vehicle combustor system) for heating intake air of an engine. Here, combustion gas of the combustor is supplied to an intake air side of the engine, and directly heats intake air of the engine.

Figure 1:
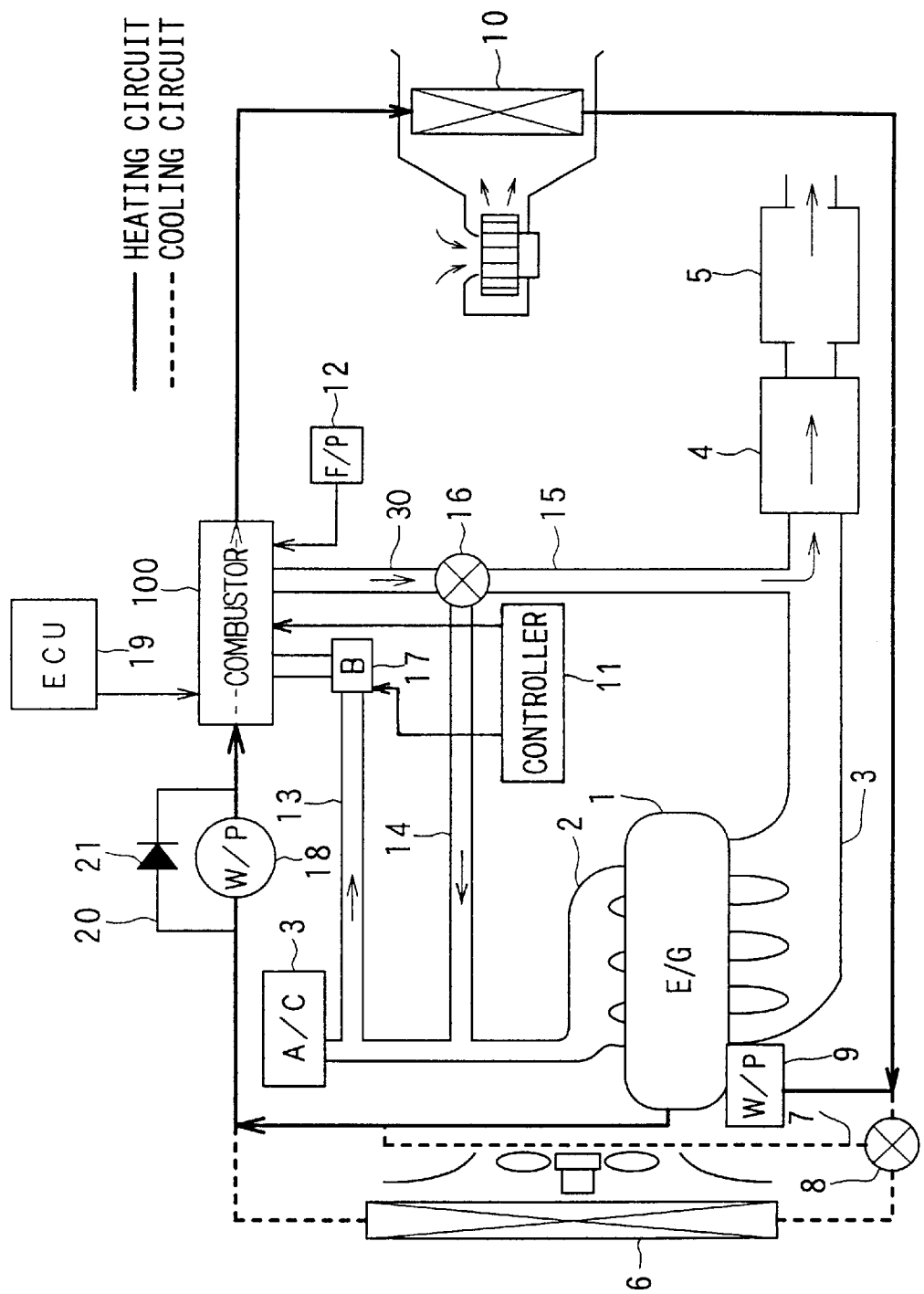
FIG. 1 is a schematic diagram showing an intake air heating system according to a first preferred embodiment of the present invention.

As shown in FIG. 1, a water-cooled diesel engine (engine) 1 is connected to an intake pipe 2, so that air (intake air) is introduced into the engine 1 through the intake pipe 2 after dust is removed by an air cleaner 31. A three-way catalytic converter (catalytic converter) 4 and a muffler 5 are provided in an exhaust pipe 3 through which exhaust gas of the engine 1 flows. The catalytic converter 4 purifies exhaust gas by facilitating the oxidation-reduction reaction of hydrocarbons, nitrogen oxides and the likes. The muffler 5 reduces noise of exhaust gas exhausted from the catalytic converter 4.

A radiator 6 cools cooling water (cooling liquid) from the engine 1. A bypass passage 7 is provided so that cooling water from the engine 1 bypasses the radiator 6 through the bypass passage 7. A thermostat 8 is disposed to switch any one of a state where the cooling water flows from the engine 1 into the radiator 6 and a state where the cooling water flows from the engine 1 into the bypass passage 7. A water pump 9 is driven by a driving force from the engine 1 to circulate the cooling water in the cooling water circuit.

A heater core 10 (heating heat exchanger) heats air to be blown into a passenger compartment using the cooling water from the engine 1 as a heat source. A fuel pump 12 sucks fuel (light oil) from a fuel tank (not shown) of the engine 1, and supplies the sucked fuel to a combustor 100.

A part of intake air from the intake pipe 2 flows into the combustor 100 through a first communication pipe 13. Combustion gas generated in the combustor 100 is introduced to the intake pipe 2 through a second communication pipe 14 and a combustion pipe 30, and is introduced to the exhaust pipe 3 through a third communication pipe 15 and the combustion pipe 30. An exhaust valve 16 is disposed to adjust a communication state of the combustion pipe 30 with the second and third communication pipes 14, 15.

A turbo-blower (blower) 17, such as a centrifugal blower, a mixed flow blower and an axial blower, is disposed for blowing air (combustion air and non-combustion air) into the combustor 100. The turbo-blower 17 applies kinetic energy to air using rotation movement of an impeller. A n electrical water pump 18 is disposed for circulating the cooling water between the combustor 100 and the heater core 10. The electrical water pump 18, the exhaust valve 16, the blower 17 and the fuel pump 12 are controlled by an electronic control unit (ECU) 19. The cooling water is introduced from the engine 1 to the combustor 100 through a bypass passage 20 while bypassing the electrical water pump 18. A check valve 21 is provided in the bypass passage 20, so that cooling water, discharged from the electrical water pump 18, from returning to an intake side of the electrical water pump 18. A controller 11 controls a solenoid valve of the combustor 100 and an amount of air blown by the blower 17. The controller 11 is also controlled by the ECU 19 to control operation of the combustor 100 and operation of the blower 17.

Figure 2A:
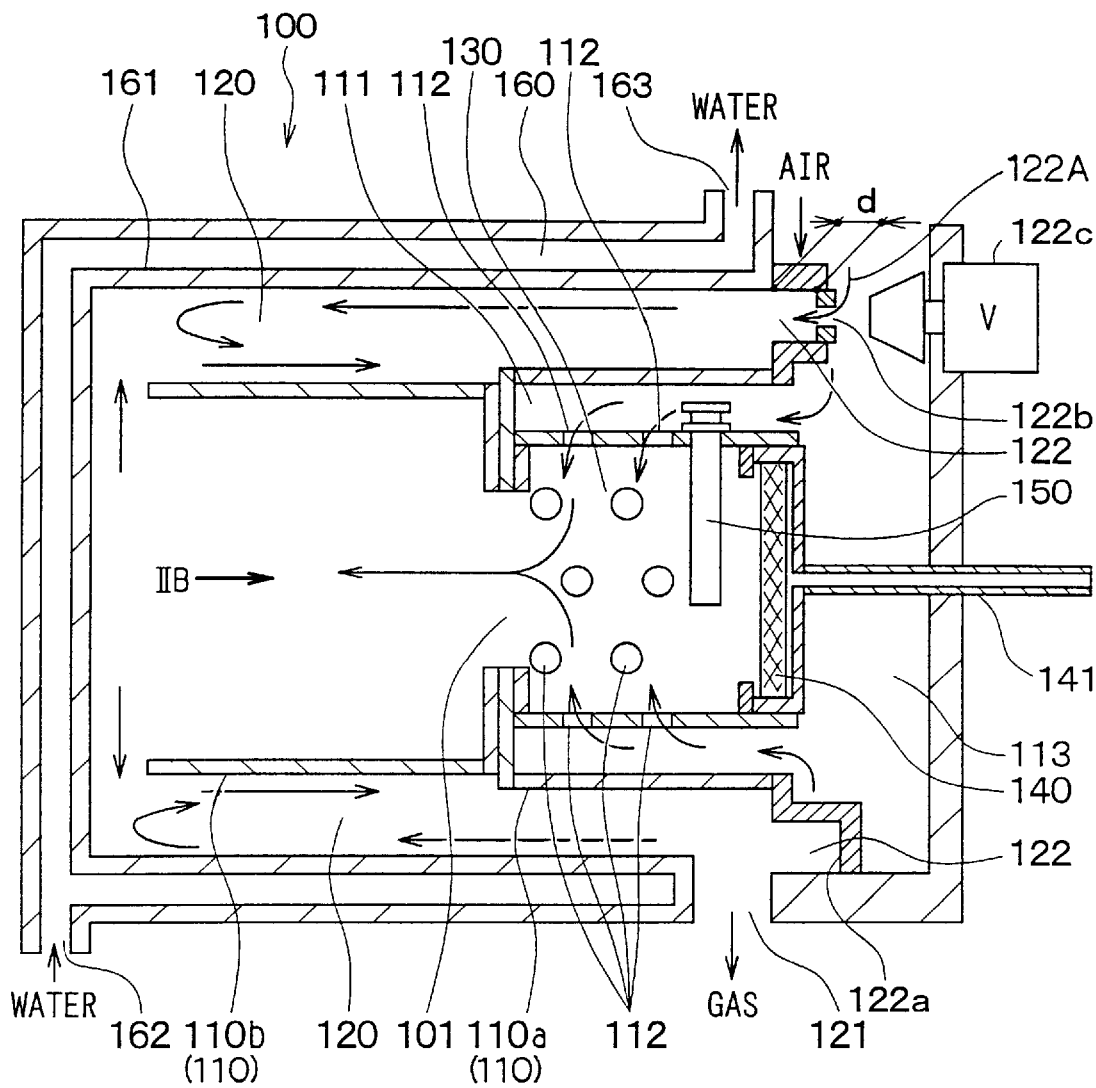
FIG. 2A is a sectional view showing a combustor according to the first embodiment.
Figure 2B:
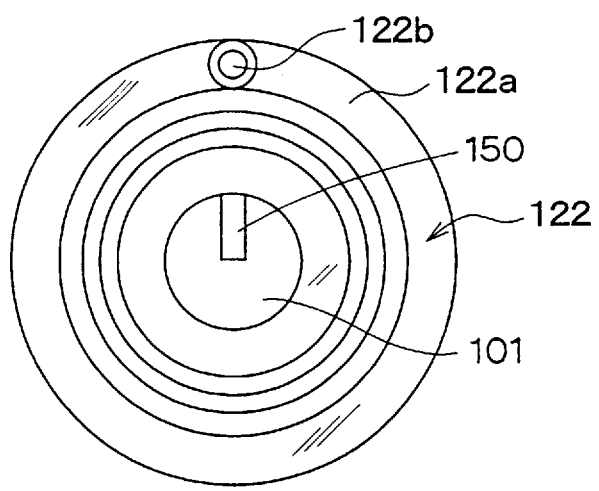
FIG. 2B is a side view when being viewed from arrow IIB in FIG. 2A.

Next, a structure of the combustor 100 according to the first embodiment will be now described with reference to FIGS. 2A, 2B. In FIG. 2A, a first combustion cylinder 110 (not shown) is constructed by combustion cylinders 110a, 110b, which are connected to each other by welding. The combustion cylinder 110a is located at a side of a combustion chamber 130 where fuel is ignited and burned. The combustion cylinder 110b is located at an opposite side of the combustion chamber 130. The first combustion cylinder 110, having a cylindrical shape, defines a combustion space where fuel is burned. Further, a combustion gas passage 120, through which combustion gas flows, is provided by an outer circumferential surface of the first combustion cylinder 110. The combustion gas passage 120 is provided to have a cylindrical shape.

A second combustion cylinder 111 is formed into a cylindrical shape having an axis line substantially parallel to an axis line of the first combustion cylinder 110, to define the combustion chamber 130. That is, the combustion chamber 130 is defined by the second combustion cylinder 111 disposed within the first combustion cylinder 110. A cylinder portion of the second combustion cylinder Ill has plural air openings 112 each of which is opened in a direction substantially perpendicular to the axial line of the second combustion cylinder 111. Through the air openings 112, air is introduced into the second combustion cylinder 111 (combustion chamber 130).

Further, a non-combustion air pressure chamber (air tank) 113, in which air blown by the blower 17 is stored, is provided around the second combustion cylinder 111 at one end side in its axial direction (right side in FIG. 2A).

The combustion chamber 130 communicates with a space within the combustion cylinder 10b through an orifice (communication opening) 101. In the first embodiment, a diameter of the orifice 101 is made smaller than a diameter of the combustion chamber 130 and a diameter of the combustion cylinder 10b. Thus, a fire in the combustion chamber 130 is prevented from excessively spreading.

A wick 140 is disposed in the second combustion cylinder 111 at one end side (right side in FIG. 2A) in the axial direction for maintaining a combustion state. Fuel is transmitted from the fuel pump 12, and is supplied to the wick 140 through a fuel pipe 141. The wick 140 is a metal mesh member having plural holes, and temporarily holds fuel in the plural holes, thereby facilitating vaporization of the fuel.

A glow plug (plug) 150 heats and ignites the fuel held in the wick 140 when being energized. The plug 150 is fixed to the second combustion cylinder 111 in the following manner. That is, a longitudinal direction of the plug 150 is fixed to be perpendicular to the axial direction of the combustion chamber 130, and the plug 150 penetrates the second combustion cylinder 111. Further, the longitudinal direction of the plug 150 is substantially parallel to a surface of the wick 140.

A hot water passage 160 (water jacket, thermal medium passage) is provided to cover the cylindrical combustion gas passage 120 provided on the outer circumferential surface of the first combustion cylinder 110. The hot water passage 160 is partitioned from the combustion gas passage 120 by a heat-conduction partition member 161. The heat-conduction partition member 161 is made of metal, and is formed into a cylindrical shape. The heat-conduction partition member 161 is disposed coaxially with the first combustion cylinder 110 to cover the first combustion cylinder 110.

The combustion gas flowing in the combustion gas passage 120 is heat-exchanged with hot water (thermal medium) flowing in the hot water passage 160 through the heat-conduction partition member 16, so that the hot water supplied to the heater core 10 is heated. The hot water flows into the hot water passage 160 from an inlet port 162, and flows outside the hot water passage 160 through an outlet port 163. on the other hand, the combustion gas discharges outside the combustor 100 from a discharge port 121 provided at a downstream side end of the combustion gas passage 120.

A jet ditch (first passage) 122 is provided at one end side of the combustion gas passage 120 (at a side of the wick 140 in the first embodiment) in the axial direction. Specifically, as shown in FIG. 2B, the jet ditch 122 has an annular shape, and is provided on all end side in a circumferential direction. The jet ditch 122 protrudes from one end of the heat-conduction partition member 161 in its axial direction toward the non-combustion air pressure chamber 113, for example, in the first embodiment.

Further, a communication port (non-combustion air introduction port) 122b, through which the combustion gas passage 120 communicates with the non-combustion air pressure chamber 113, is provided in a bottom surface (end surface) of the jet ditch 122. The communication port 122b and the jet ditch 122 are provided, so that air from the non-combustion air pressure chamber 113 jetted into the combustion gas passage 120 through the jet ditch 122, flows through the combustion gas passage 120 along an inner wall surface of the heat-conduction partition member 161.

A solenoid valve 122c is disposed for opening and closing the communication port 122b. As shown in FIG. 2A, the solenoid valve 122c is disposed at a position proximate to the communication port 122b for readily opening and closing the communication port 122b. However, the solenoid valve 122c is not need to be disposed around the communication passage 122b. For example, an extension member such as a rod and a pipe can be extended from the communication port 122b, and the solenoid valve 122c may be disposed within the extension member.

In the first embodiment, the solenoid valve 122c, the communication port 122b and the blower 17 construct non-combustion air introduction means for introducing non-combustion air having a low temperature lower than the temperature of the combustion fuel into the combustion fuel passage 120.

Next, operations and features of the intake-air heating system and the combustor 100 will be now described.

When an engine key switch (not shown) is turned on for starting the operation of the engine 1, vehicle electrical equipments such as an injector (fuel injector) and an instrument panel can be energized. At this time, the combustor 100 is operated while the communication port 122b is opened. Then, until cranking of the engine 1 is started, a part of combustion gas, discharged from the discharge port 121 of the combustor 100, is supplied to the second communication pipe 14 (intake pipe 2). Further, the exhaust valve 16 is operated so that the other part (remainder part) of the combustion gas from the discharge port 121 is discharged to the third communication pipe 15 (exhaust pipe 3).

Here, the cranking of the engine 1 indicates a start operation of the engine 1 by rotating a crankshaft (not shown) of the engine 1 using a rotation source such as a self-starting motor and by sucking air and compressing the intake air. At the engine starting operation, an indication lamp 15. (not shown) is lighted, and indicates for a driver (passenger) that a part of the combustion gas is supplied from the combustor 100 to the intake pipe 2 so as to heat the intake air. In the first embodiment, the indication lamp is provided on the instrument panel where a speed meter is provided.

Then, as indicated by the arrow 122A in FIG. 2A, the non-combustion air flows along the inner wall surface of the heat-conduction partition member 161. Therefore, the non-combustion air functions as an air curtain for interrupting a heat conduction from the combustion gas to the hot water, thereby restricting heat-exchange therebetween. Accordingly, the temperature of the combustion gas decreases in the combustion gas passage 120, and a temperature difference between the combustion gas and the hot water decreases. Because heat of the combustion gas can be prevented from being transmitted into the hot water, a large amount of heat can be supplied to the engine 1 through the second communication pipe 14 and the intake pipe 2 when the engine 1 is started. Here, since the intake air can be readily sufficiently heated to have a temperature of about 40° C. by using the combustion gas from the combustion chamber 130 of the engine 1, even when the combustion gas is cooled using the non-combustion air.

When the combustion gas having a high temperature is supplied to an intake side of the engine 1 through the second communication pipe 14 and the intake pipe 12, a large amount of heat is radiated from the combustion gas having a high temperature to atmospheric air (outside air). However, in the first embodiment, because the combustion gas is mixed with the non-combustion air, the temperature of the combustion gas is decreased. Since the combustion gas having the decreased temperature is supplied to the intake side of the engine 1, a temperature difference between the supplied combustion gas and the outside air becomes smaller. Therefore, an amount of heat, radiated from the supplied combustion gas to the outside air based on the temperature difference, can be reduced. Accordingly, when the engine 1 is started, heat can be readily supplied from the combustor 100 to the intake side of the engine 1 without being excessively radiated outside.

Further, the jet ditch 122 having the annular shape (ring shape) is provided on the one side end of the combustion gas passage 120 in the axial direction, along all the periphery of the annular shape. Therefore, the non-combustion air, discharged from the communication port 122b, spreads along the inner wall surface of the jet ditch 122, and fills within all of the jet ditch 122. Then, the non-combustion air is supplied (jetted) from all inner space of the jet ditch 122 into the combustion gas passage 120. Accordingly, it can prevent the non-combustion air from flowing only around the communication port 122b in the combustion gas passage 120. Therefore, the non-combustion air can be used as an air curtain on all the inner wall of the heat-conduction partition member 161 having the cylindrical shape. Therefore, it can restrict excessive heat-exchange from being performed between the combustion gas in the combustion gas passage 120 and the hot water in the hot water passage 160.

The jet ditch 122 is a buffer tank which temporarily stores the non-combustion air to be jetted into all of the combustion gas passage 120. Therefore, as the depth (dimension in the axial direction) "d" of the jet ditch 122 is made larger so that a capacity of the jet ditch 122 is made larger, the non-combustion air can be more surely prevented from flowing only around the communication port 122b.

Next, when a predetermined time passes after starting to supply the combustion gas into the intake pipe 2, it is determined that the temperature of the intake air reaches to a predetermined temperature where the engine 1 can be sufficiently started. Then, the indication lamp is turned off, thereby suggesting a cranking for the driver. When the driver turns on a starter switch and actually starts cranking, the exhaust valve 16 is operated so that all of the combustion gas is supplied from the combustor 100 to the intake pipe 2.

After the engine 1 starts, when heating capacity of the heater core 10 is need to be increased by sufficiently heating the hot water flowing in the hot water passage 160 using the combustor 100, the combustor 100 is continuously operated while non-combustion air is not introduced into the combustion gas passage 120 by closing the communication port 122*b*. At the same time, all of the combustion gas is discharged to an exhaust side of the engine 1 (catalytic converter 4). Here, the state that the engine 1 is started, indicates that the engine 1 itself operates by sucking air and compressing the intake air without cranking. Specifically, this state is an operation state where the rotation speed of the engine 1 becomes higher than that in the cranking.

When the passenger compartment is heated using the combustor 100 while the engine 1 is stopped, the combustor 100 is operated, and all of the combustion gas is discharged from the combustor 100 to the exhaust side of the engine 1 (catalytic converter 4).

Since the combustion gas is supplied from the combustor 100 to the intake pipe 2 until the engine 1 is started, a concentration of oxygen gas contained in the intake air of the engine 1 becomes lower. Therefore, in this case, starting performance (ignition performance) of the engine 1 may be reduced. However, in the first embodiment of the present invention, since the non-combustion air is mixed in the combustion gas and is supplied to the intake side of the engine 1, the concentration of oxygen gas contained in the intake air of the engine 1 becomes higher. Therefore, the starting performance of the engine 1 can be improved.

While the non-combustion air is introduced to the combustion gas passage 120 by opening the communication port 122*b*, the air, to be originally supplied into the combustion chamber 130, in the non-combustion air pressure chamber 113 flows into the combustion gas passage 120. Therefore, in this case, an amount of air used for combustion is reduced in the combustion chamber 130. In the first embodiment of the present invention, when the communication port 122*b* is opened, an air-blowing amount of the blower 17 is increased than that when the communication port 122*b* is closed, thereby preventing incomplete combustion and a misfire in the combustor 100. When the non-combustion air is introduced into the combustion gas passage 120, the air-blowing capacity of the blower 17 is increased by a capacity corresponding to at least an amount of the non-combustion air introduced into the combustion gas passage 120.

Figure 3A:
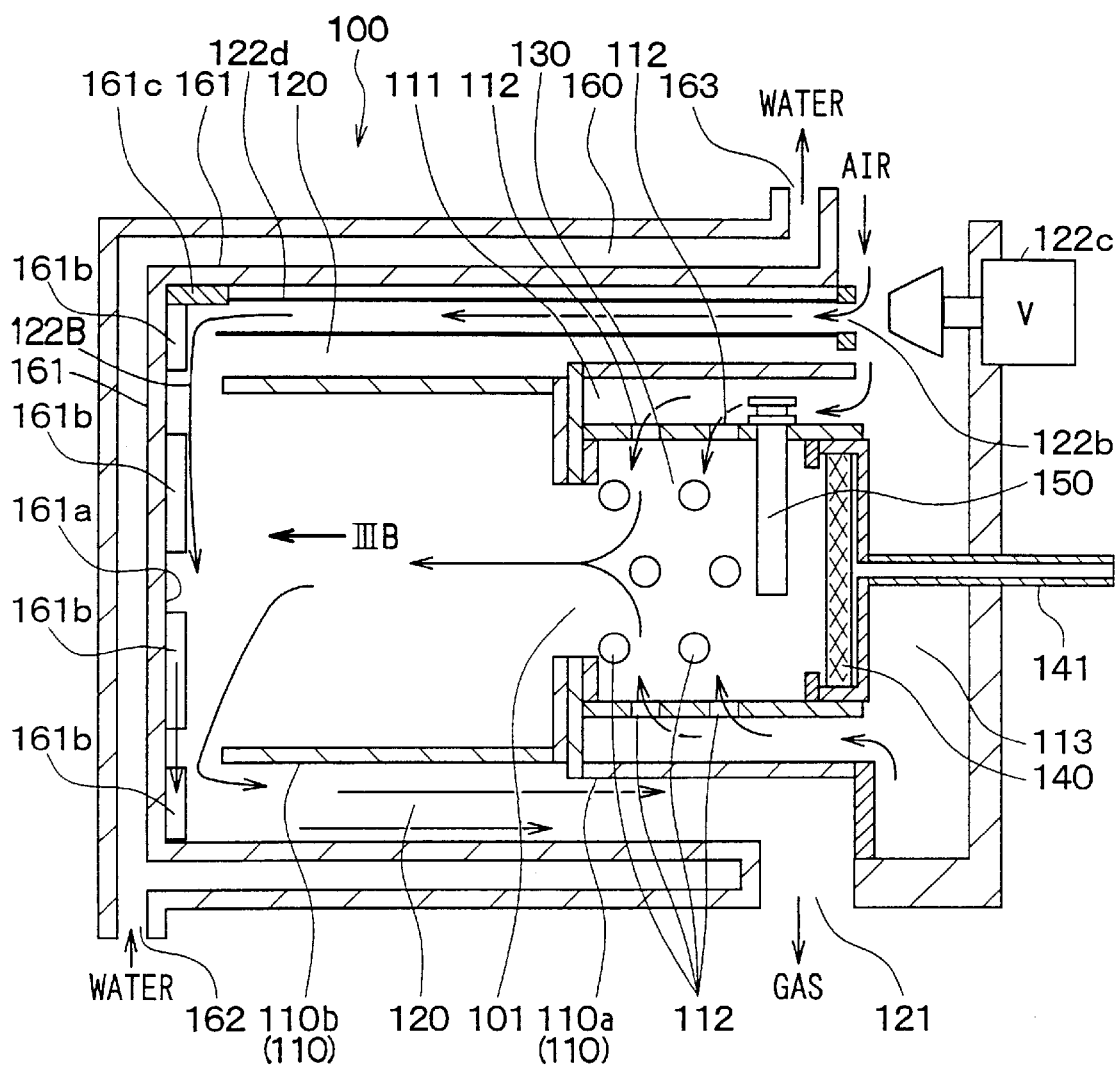
FIG. 3A is a sectional view showing a combustor according to a second preferred embodiment of the present invention.
Figure 3B:
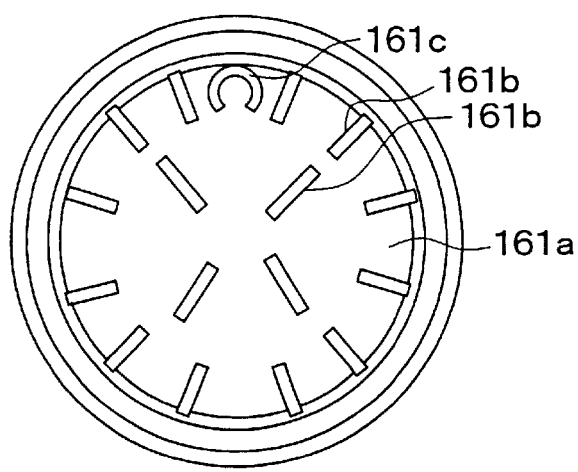
FIG. 3B is a side view when being viewed from arrow IIIB in FIG. 3A.

A second preferred embodiment of the present invention will be now described with reference to FIGS. 3A and 3B. In the second embodiment, as shown in FIG. 3A, the jet ditch 122 described in the first embodiment is eliminated. A communication pipe 122*d* (second passage), extending from the communication port 122*b* in the axial direction, is provided in the combustion gas passage 120 along the inner wall surface of the heat-conduction partition member 161. As shown in FIG. 3B, guide fins 161*b* are integrated with an end surface 161*a* of the heat-conduction partition member 161 at the other end side (opposite side of the wick 140) in the axial direction. The guide fins 161*b* are separately disposed to extend in a radial direction on the end surface 161*a*.

Further, a holder member 161*c* substantially having a C-shaped cross section is integrated with the end surface 161*a* of the heat-conduction partition member 161. The holder member 161*c* holds the communication pipe 122*d* at one end in its longitudinal direction (axial direction). The non-combustion air flowing through the communication pipe 122*d* collides with the end surface 161*a*. Then, as indicated by the arrow 122B, the flow direction of the non-combustion air is changed substantially by 90 degrees after the collision, and the non-combustion air flows toward a center portion along the end surface 161*a*. Thereafter, the non-combustion air flows outside in the radial direction of the first combustion cylinder 110 along the guide fins 161*b* in accordance with the gas pressure of the combustion gas discharged from the first combustion cylinder 110.

Accordingly, the non-combustion air can be introduced around all the end surface 161*a*. Therefore, it can effectively restrict a heat exchange between the combustion gas and the hot water by using the air-curtain function of the non-combustion air. As a result, it can restrict the heat of the combustion gas from being transmitted into the hot water in the hot water passage, and a large amount of heat can be supplied to the intake side of the engine 1 when the engine 1 is started.

When the heating capacity of the heater core 10 is increased using the combustor 100 after starting the engine 1, the communication port 122*b* of the combustor 100 is closed. In this case, because a heat-transmitting area is increased by the guide fins 161*b* between the combustion gas and the heat-conduction partition member 161, the heat-exchange is facilitated between the combustion gas and the hot water, thereby increasing the heating capacity of the heater core 10.

Figure 4:
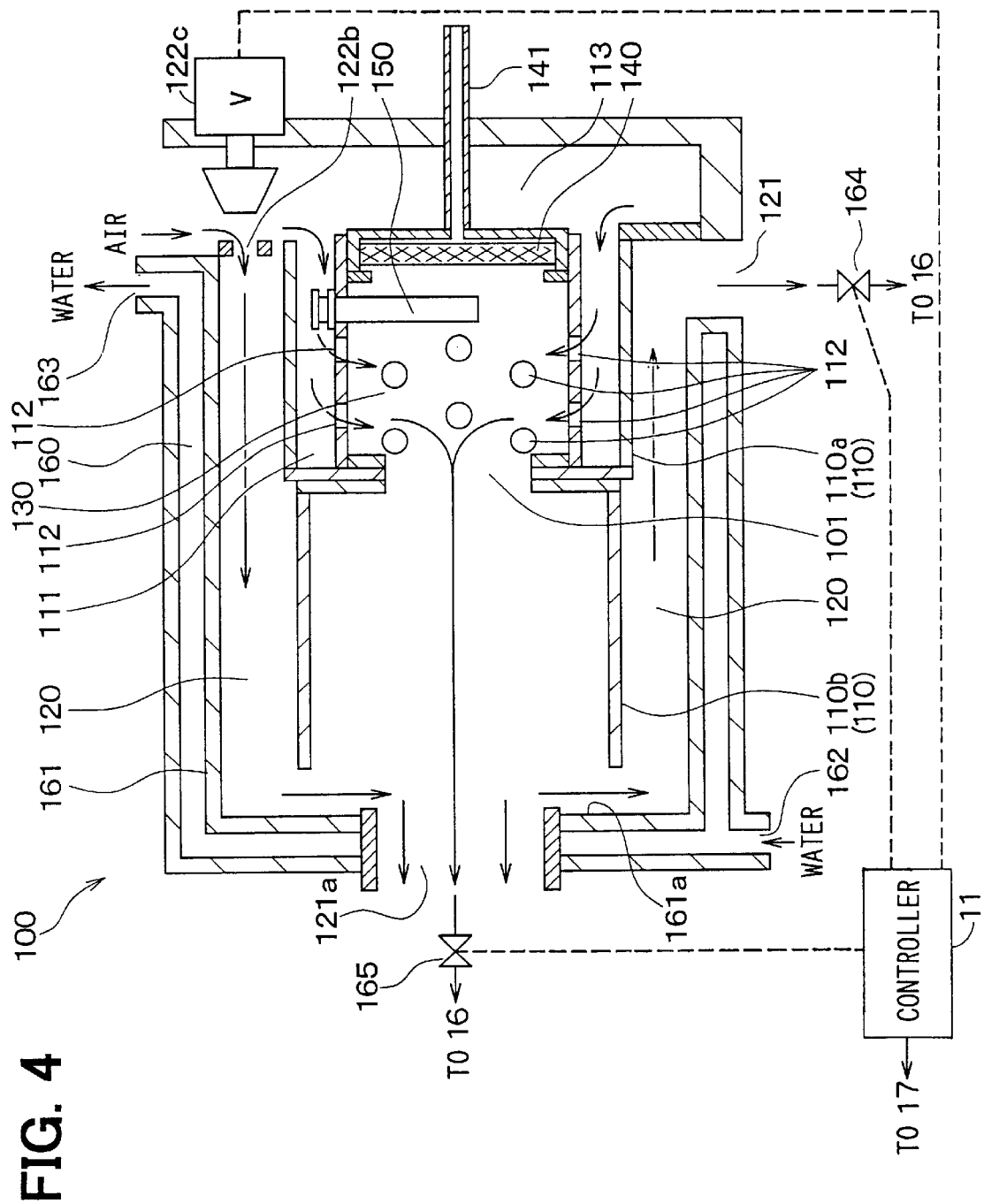
FIG. 4 is a sectional view showing a combustor according to a third preferred embodiment of the present invention.

A third embodiment of the present invention will be now described with reference to FIG. 4. In the third embodiment, as shown in FIG. 4, an another discharge port 121*a* is provided on the end surface 161*a*. The combustion gas without being heat-exchanged with hot water, is jetted from the first combustion cylinder 110, and is discharged from the discharge port 121*a*. When the combustion gas of the first combustion cylinder 110 is supplied to the intake side of the engine 1, the combustion gas is discharged from the discharge port 121*a*. On the other hand, when the combustion gas is not supplied to the intake side of the engine 1, that is, when the heating capacity of the heater core 10 is increased using the combustor 100, the combustion gas is discharged from the discharge port 121.

In the third embodiment, since the jet ditch 122 and the communication pipe 122*d* described in the above first and second embodiments are not provided, it is preferable that the non-combustion air flows around the heat-conduction partition member 161. Accordingly, in the third embodiment, the communication port 122*b* is provided at a position proximate to the heat-conduction partition member 161, or is opened toward the heat-conduction partition member 161, so that the non-combustion air is blown from the communication port 122*b* toward the heat-conduction partition member 161. A first exhaust valve 164 opens and closes the discharge port 121, and a second exhaust valve 165 opens and closes the discharge port 121*a*. The downstream parts of the exhaust valves 164, 165 are coupled to the exhaust valve 16 shown in FIG. 1. A controller 11 shown in FIG. 4 electrically controls the exhaust valves (solenoid valves or electrical valves) 164, 165.

Next, operations and features of the first and second exhaust valves 164, 165 will be now described.

Firstly, when the intake air of the engine 1 or the catalytic converter 4 is heated, high-temperature combustion gas is supplied to the intake air side of the engine or to the catalytic converter 4 from the combustor 100 by opening at least the discharge port 121*a*. In this case, since the non-combustion air is supplied from the communication port 122*b* to the combustion gas passage 120, the temperature of the second exhaust valve 165 can be restricted from being increased, as compared with a case where only the combustion gas is supplied from the discharge port 121a without the non-combustion air. Accordingly, thermal reliability of the second exhaust valve 165 can be improved. On the other hand, the discharge port 121 is opened and closed according to a heat amount required for the intake air of the engine 1 or for the catalytic converter 4. Specifically, the discharge port 121 is closed when a large amount of heat is required for the intake air of the engine 1 or for the catalytic converter 4, and the discharge port 121 is opened when a large amount of heat is not required for the intake air of the engine 1 or for the catalytic converter 4.

Next, when the passenger compartment is heated, the discharge port 121a is closed, and only the discharge port 121 is opened. Therefore, the combustion gas can be positively circulated into the combustion gas passage 120, and a large amount of heat can be supplied from the combustion gas to the hot water flowing in the hot water passage 160.

Figure 5:
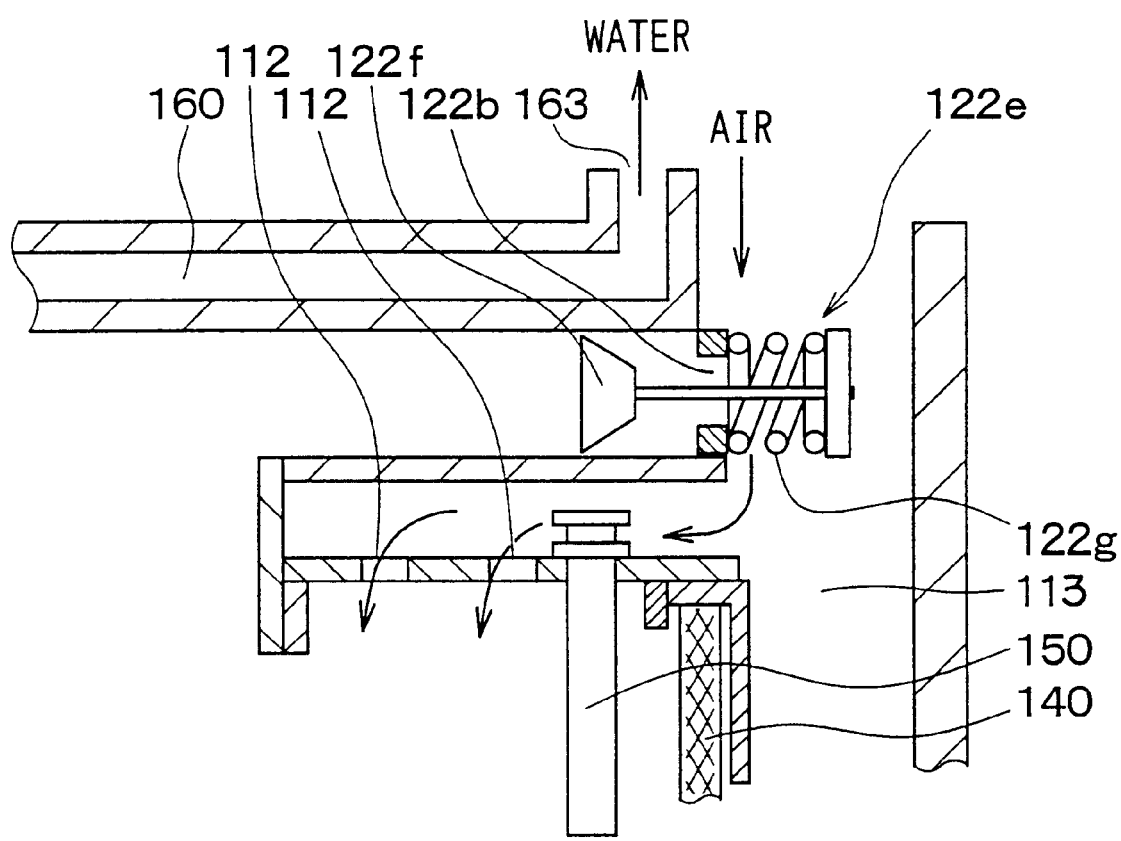
FIG. 5 is a schematic sectional view showing a relief valve (check valve) used for the combustor according to a fourth preferred embodiment of the present invention.

A fourth embodiment of the present invention will be now described with reference to FIG. 5. In the fourth embodiment, as shown in FIG. 5, a mechanical relief valve (relief valve) 122e is used as an opening/closing device for opening and closing the communication port 122b. The relief valve 122e opens the communication port 122b when a pressure difference between the combustion gas chamber 120 and the non-combustion air pressure chamber 113 is equal to or higher than a predetermined pressure. The relief valve 122e is composed of a valve body 122f for opening and closing the communication port 122b and a spring 122g for applying an elastic force to the valve body 122f. The communication port 122b is opened using a pressure difference between a negative pressure, generated by cranking, in the combustion gas chamber 120 and a pressure, increased by increasing an air-blowing amount (blowing performance) of the blower 17, in the non-combustion air pressure chamber 113.

Accordingly, in the fourth embodiment, since g electronic control portion for opening and closing the communication port 122b can be eliminated, production cost of the combustor 100 (intake air heating system) can be reduced.

Although the present invention has been fully described in connection with the preferred embodiments thereof with reference to the accompanying drawings, it is to be noted that various changes and modifications will become apparent to those skilled in the art.

For example, in the above-described embodiments, the combustion gas may be supplied to the catalytic converter 4 to rapidly activate the catalytic converter 4. Furthermore, this invention can be applied to a gasoline engine.

Such changes and modifications are to be understood as being within the scope of the present invention as defined by the appended claims.

What is claimed is:

1. A combustor for supplying a combustion heat to a heating heat exchanger for heating a vehicle compartment and to other vehicle equipment, the combustor comprising:
   a combustion chamber for burning fuel using air for combustion introduced from an outside to generate combustion gas, the combustion gas being heat-exchanged with a thermal medium flowing into the heating heat exchanger,
   a partition member, through which the heat exchange between the combustion gas and the thermal medium is performed, for partitioning from each other a combustion gas passage through which the combustion gas from the combustion chamber flows and a thermal medium passage through which the thermal medium flows, the thermal medium passage being connected to the heating heat exchanger;
   a first discharge port from which the combustion gas is supplied to the other vehicle equipment, the first discharge port being provided in the combustion gas passage;
   a non-combustion air introduction port, from which air for non-combustion is introduced into the combustion gas passage toward the partition member, the air for non-combustion having a temperature lower than a temperature of the combustion gas; and
   an opening/closing device for opening and closing the non-combustion air introduction port.

2. The combustor according to claim 1, wherein the non-combustion air introduction port is provided at a side of the partition member in such a manner that the air for non-combustion flows along a wall surface of the partition member.

3. The combustor according to claim 1, wherein:
   the combustion chamber is defined by a combustion cylinder having a cylindrical shape;
   the partition member has a cylindrical shape, and is coaxially disposed with the combustion cylinder to cover the combustion cylinder; and
   the combustion gas passage is provided between the combustion gas cylinder and the partition member, the combustor further comprising:
   a first passage provided at one end of the combustion gas passage in its axial direction, to be connected to an entire periphery of the combustion gas passage at the one end, wherein the non-combustion air introduction port is provided in the first passage.

4. The combustor according to claim 1, wherein:
   the combustion gas passage has a second passage extending from the non-combustion air introduction port in the axial direction of the combustion gas passage, at a position proximate to the partition member; and
   the non-combustion air introduction port and the second passage are provided so that the air for non-combustion, introduced from the non-combustion air introduction port into the second passage, is jetted toward the partition member.

5. The combustor according to claim 1, wherein:
   the opening/closing device is a mechanical relief valve which opens the non-combustion air introduction port when a pressure difference between a front side of the non-combustion air introduction port and a rear side thereof becomes equal to or larger than a predetermined pressure.

6. The combustor according to claim 1, further comprising:
   a second discharge port from which a part of the combustion gas is directly discharged without being heat-exchanged with the thermal medium;
   a first switching unit for opening and closing the first discharge port; and
   a second switching unit for opening and closing the second discharge port.

7. The combustor according to claim 6, wherein:
   when the combustion heat is supplied to the heating heat exchanger, the first switching unit opens the first discharge port, and the second switching unit closes the second discharge port.

8. The combustor according to claim 7, wherein:

when the combustion heat is supplied to the other vehicle equipment, the first switching unit closes the first discharge port, and the second switching unit opens the second discharge port.

9. The combustor according to claim 1, further comprising:

an air pump for blowing the air for combustion and the air for non-combustion; and a control unit for controlling air-blowing capacity of the air pump, wherein:

the control unit increases the air-blowing capacity of the air pump when the air for non-combustion is introduced into the combustion gas passage through the non-combustion air introduction port, than that when the non-combustion air introduction port is closed and air is blown by the air pump only for combustion.

10. The combustor according to claim 9, wherein:

when the air for non-combustion is introduced into the combustion gas passage, the control unit increases the air-blowing capacity of the air pump by a capacity corresponding to at least an amount of the air for non-combustion introduced into the combustion gas passage.

11. The combustor according to claim 1, wherein the other vehicle equipment is an engine for driving a vehicle.

12. The combustor according to claim 1, wherein the other vehicle equipment is a catalytic converter.

13. A control method of a combustor for supplying a combustion heat to a heating heat exchanger for heating a vehicle compartment and to other vehicle equipment, the combustor including a heat-conduction partition member for partitioning from each other a combustion gas passage through which a combustion gas from a combustion chamber flows and a thermal medium passage through which the thermal medium flowing into the heating heat exchanger flows, the control method comprising:

introducing air for non-combustion into the combustion gas passage toward the heat-conduction partition member from a non-combustion air introduction port provided in the combustion gas passage, when a combustion heat of the combustion gas is supplied to the other vehicle equipment; and increasing air-blowing capacity of an air pump for blowing air for combustion and air for non-combustion when the air for non-combustion is introduced into the combustion gas passage through the non-combustion air introduction port, than that when the non-combustion air introduction port is closed and air is blown by the air pump only for combustion in the combustion chamber.

14. The control method according to claim 13, wherein:

when the air for non-combustion is introduced into the combustion gas passage, the air-blowing capacity of the air pump is increased by a capacity corresponding to at least an amount of the air for non-combustion introduced into the combustion gas passage.

15. The control method according to claim 13, wherein:

when the combustion heat is supplied to the heating heat exchanger, a first discharge port provided in the combustion gas passage is opened, and a second discharge port from which a part of the combustion gas is directly discharged without being heat-exchanged with the thermal medium is closed.

16. The control method according to claim 15, wherein:

when the combustion heat is supplied to the other vehicle equipment, the first discharge port is closed, and the second discharge port is opened.

* * * * *